Figure 1:
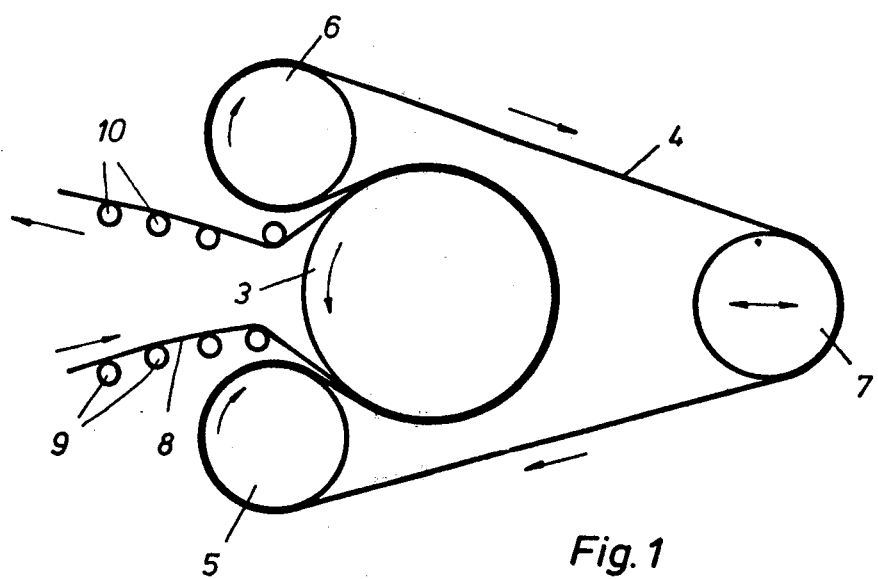

United States Patent [19]

Gersbeck et al.

[11] 4,269,585
[45] May 26, 1981

[54] APPARATUS, INCLUDING AN ENDLESS BELT, FOR CONTINUOUSLY HOT PRESSING A WEB OF MATERIAL

[75] Inventors: Rolf Gersbeck, Ronnenberg; Manfred Krohn, Hanover, both of Fed. Rep. of Germany

[73] Assignee: Hermann Berstorff Maschinenbau GmbH, An der Breiten Wiese, Fed. Rep. of Germany

[21] Appl. No.: 107,567

[22] Filed: Dec. 27, 1979

[30] Foreign Application Priority Data

Dec. 29, 1978 [DE] Fed. Rep. of Germany ....... 2856646

[51] Int. Cl.³ .................. B29C 3/00; B29D 77/00; B29H 7/22
[52] U.S. Cl. .................................................. 425/373
[58] Field of Search ................ 425/363, 364, 341, 373

[56] References Cited

U.S. PATENT DOCUMENTS

| 3,041,661 | 7/1962 | Elliott | 425/373 X |
| 3,258,812 | 7/1966 | Willy | 425/373 X |
| 4,177,725 | 12/1979 | Gersbeck | 425/373 X |

Primary Examiner—J. Howard Flint, Jr.
Attorney, Agent, or Firm—Schwartz, Jeffery, Schwaab, Mack, Blumenthal & Koch

[57] ABSTRACT

An endless belt, for apparatus for continuously hot pressing webs of material by pulling the belt against the periphery of a heated rotatable drum with the web interposed therebetween, comprising a layer of butyl rubber bonded to a fabric of steel wires, a textile layer adhered to the butyl rubber and a layer of silicon rubber adhered to the textile layer. In manufacture the fabric of steel wires is encased in the butyl rubber, the textile layer is adhered to the butyl rubber and the composite article is vulcanized. After vulcanization, the silicon rubber layer is adhered to the textile layer and the composite article thus formed again vulcanized.

2 Claims, 2 Drawing Figures

APPARATUS, INCLUDING AN ENDLESS BELT, FOR CONTINUOUSLY HOT PRESSING A WEB OF MATERIAL

The invention relates to hot pressing webs of material such as rubber, plastics paper impregnated with resin and laminates.

Apparatus for continuously vulcanising webs of rubber or for welding webs of sheeting are known. Such apparatus can have an endless pressure belt, which presses the material to be compressed against a heated revolving drum. At the side facing towards the pressure drum the endless belt is provided with a resilient cover which is resistant to high temperatures. The material supporting the resilient cover is an endless fabric of woven steel wires.

It is known (DE-GM 72 11 983) to make the resilient coating of the endless belt from a layer of silicon rubber. The advantage of such a layer is that it has good resistance to high temperatures and ages only slowly. It remains flexible for a long time. The cost of the silicon rubber is however very high.

Although the temperature resistance of the layer of silicon rubber enables a pressure belt of this construction to be used, it has been found that the mechanical strain on this layer due to changes is bending and bending tensions is not unlimited. The expensive layer of silicon rubber has been found to become separated from the fabric of steel wires after a relatively short operating time. The short working life of the endless pressure belt makes the continuously operating presses less economic.

The premature loosening of the layer of silicon rubber is explained by the fact that it must have a determined minimum thickness in order to prevent the steel wires of the fabric from pushing through. Owing to the poor heat conductance of silicon rubber, however, one cannot always ensure that the layer will be vulcanised right through with this minimum thickness. The main reason however is that, despite the use of commercial adhesives, the bond between the silicon rubber and the fabric of steel wires is inadequate to give a prolonged working life.

The invention has among it objects to provide apparatus for continuously hot pressing a web of material and including an endless pressure belt having a resilient covering layer with a prolonged working life. It is also among the objects of the invention to provide a continuously operating apparatus of this kind which can be operated more economically.

According to one aspect of the invention there is provided apparatus for continuously hot pressing a web of material comprising a heated rotatable drum, an endless pressure belt and means to pull the endless pressure belt against a part of the periphery of the drum with the web interposed between the drum and the belt, wherein the endless pressure belt is formed of a fabric of steel wires faced, at the side towards the web, with a resilient covering layer comprising a layer of butyl rubber bonded to the fabric of steel wires, a textile layer secured to the layer of butyl rubber and a layer of an elastomer resistant to high temperature secured to the textile layer to form the outer layer of the resilient covering layer.

The layer of butyl rubber can be relatively very cheap and, apart from the price advantage, can provide a good bond with the fabric of steel wires using known adhesives. The intermediate textile layer secures together the layer of butyl rubber and the layer of silicon rubber. The textile layer may also act as a resilient compensating member for slight tolerances in the thickness of the resilient covering or of the product to be pressed. These tolerances can be compensated for better with a resilient covering layer constructed in accordance with the invention than they would be with a compact resilient covering.

There is provided a method of making an endless pressure belt comprising a fabric of steel wires with a resilient covering layer for use in apparatus for continuously hot pressing a web of material, said apparatus also comprising a heated rotatable drum and means to pull the endless pressure belt against a part of the periphery of the drum with the web interposed between the drum and the belt, said method comprising superimposing and pressing together the fabric of steel wires and a layer of butyl rubber with an adhesive between them, coating with an adhesive the exposed surface of at least one of the layer of butyl rubber and a textile layer and pressing them together, bonding the combined fabric of steel wires, butyl rubber layer and textile layer by the action of heat and pressure with simultaneous vulcanisation of the butyl rubber layer, coating with adhesive the exposed surface of at least one of the textile layer and a silicon rubber layer and applying heat and pressure to secure the silicon rubber layer to the textile layer with simultaneous vulcanisation.

The layer of butyl rubber can be fully vulcanised at lower temperatures than the layer of silicon rubber. It is therefore easy to vulcanise right through the layer of butyl rubber, which is a constituent film of the covering layer. In an endless pressure belt constructed by the method of the invention, the expensive layer of silicon rubber can be made considerably thinner than it could with a compact covering layer of silicon rubber.

The invention can thus enable the good temperature resistance of silicon rubber to continue to be exploited, while at the same time greatly improving the mechanical join between the resilient covering layer and the fabric of steel wires. The resilient covering layer of the endless pressure belt can thus be cheaper to manufacture, since a considerable part of the resilient covering layer may comprise relatively cheap butyl rubber.

Figure 2:
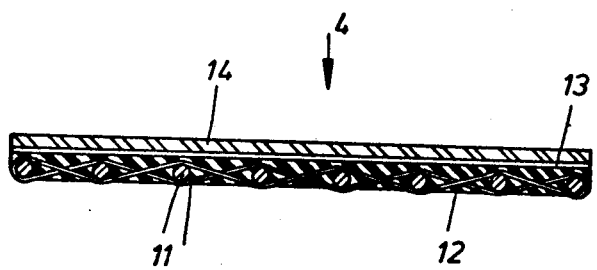

The invention is diagrammatically illustrated by way of example in the accompanying drawing, in which:

FIG. 1 shows apparatus for continuously hot pressing a web of material and including an endless pressure belt; and FIG. 2 is a cross-section through the endless pressure belt of the apparatus of FIG. 1.

Referring to the drawing, continuously operable pressing apparatus shown in FIG. 1, has a central, heated, rotatable pressure drum 3. An endless pressure belt 4 is looped around a part of the periphery of the drum 3. The belt 4 is guided by direction-changing rollers 5, 6, 7, the roller 7 being mounted to be movable so as to form a tensioning roller for the belt 4. The part of the periphery of the drum 3 with the belt looped round it forms, with the belt 4, a pressure section in which a web of material 8, which passes through continuously, is subjected to compressive treatment accompanied by the action of heat. Upstream of an inlet for guiding the web of material 8 into the pressure section there is a roller arrangement 9 for guiding the web 8. A further roller arrangement 10 for the pressed web 8 of material is provided at an outlet from the pressure section.

The construction of the endless pressure belt 4 can be seen from the cross-sectional representation in FIG. 2. A fabric of steel wires 11 is encased in a layer 12 of butyl rubber, the butyl rubber being bonded to the fabric 11 using commercial adhesives and by vulcanisation. Before vulcanisation is effected, one or other or both of the butyl rubber 12 and a textile layer 13 are coated with an adhesive and the textile layer 13 is applied to the butyl rubber 12. During the vulcanisation of the butyl rubber 12 the textile layer 13 is secured thereto. An upper, covering layer 14, which covering layer in use faces towards the pressure drum 3, is of silicon rubber, and is applied to the textile layer 13 with the interposition of a suitable adhesive, e.g., silicon rubber paste, and the belt is then heat treated to vulcanise the silicon rubber layer 14.

The layer 12 of butyl rubber bonded to the fabric of steel wires 11 ensures that the resilient covering layer will be joined firmly and securely to the fabric 11. The textile layer 13 acts as an intermediate layer to form a good join with the upper layer 14 of silicon rubber.

What is claimed is:

1. Apparatus for continuously hot pressing a web of material comprising a heated rotatable drum, an endless pressure belt and means to pull said endless pressure belt against a part of the periphery of said drum with the web interposed between said drum and said belt, wherein said endless pressure belt is formed of a fabric of steel wires faced, at the side towards the web, with a resilient covering layer comprising a layer of butyl rubber bonded to said fabric of steel wires, a textile layer secured to said layer of butyl rubber and a layer of an elastomer resistant to high temperature secured to said textile layer to form the outer layer of said resilient covering layer.

2. Apparatus as claimed in claim 1, wherein said elastomer is silicon rubber.

* * * * *